United States Patent [19]

Pieh et al.

[11] 4,272,430
[45] Jun. 9, 1981

[54] ADDITIVE FOR INORGANIC BINDERS

[75] Inventors: Stefan Pieh, Linz; Hubert Czepel, Dornach, both of Austria

[73] Assignee: Chemie Linz Aktiengesellschaft, Linz, Austria

[21] Appl. No.: 46,778

[22] Filed: Jun. 8, 1979

[30] Foreign Application Priority Data

Jun. 16, 1978 [DE] Fed. Rep. of Germany ....... 2826447

[51] Int. Cl.³ .............................................. C08L 61/20
[52] U.S. Cl. .................................. 260/39 R; 528/256
[58] Field of Search ........................... 260/39; 528/256

[56] References Cited

U.S. PATENT DOCUMENTS

| 2,141,569 | 12/1938 | Tucker et al. | 106/27 |
| 2,169,980 | 8/1939 | Scripture et al. | 106/27 |
| 2,407,599 | 9/1946 | Auten et al. | 528/256 |
| 2,445,569 | 7/1948 | Fox | 528/38 |
| 2,809,954 | 10/1957 | Kazenas | 260/39 R |
| 3,985,696 | 10/1976 | Aignesberger et al. | 528/256 |

FOREIGN PATENT DOCUMENTS

| 342867 | 4/1978 | Fed. Rep. of Germany. | |
| 628818 | 9/1949 | United Kingdom | 528/256 |
| 1169582 | 11/1969 | United Kingdom. | |

Primary Examiner—Lewis T. Jacobs
Attorney, Agent, or Firm—Wenderoth, Lind & Ponack

[57] ABSTRACT

Additive for inorganic binders, such as cements, calcium sulfate, magnesia cement and the like, which comprises, as the active ingredient, a water-soluble salt of a mixed resin consisting of an aromatic aminosulfonic acid, urea, melamine and formaldehyde, the molar ratio, in the resin, of aromatic aminosulfonic acid to the total amount of melamine and urea being (0.2 to 1.0):1.0 and the molar ratio of melamine to urea being from 0.75:0.25 to 0.30:0.70, and also building materials, having increased flowability and early strength, in which this additive is present.

5 Claims, No Drawings

ADDITIVE FOR INORGANIC BINDERS

The invention relates to an additive for inorganic binders, in particular cement, which is based on a melamine/urea mixed resin with formaldehyde and which improves the flowability and early strength of the building material produced therefrom, and also to the building material produced therewith and a process for its production.

It is known from U.S. Pat. No. 2,141,569 that the flowability of building materials based on cement can be increased by means of agents which have a dispersing action on the cement. Since a lower water/cement ratio can be maintained by increasing the flowability, it is possible to achieve higher strengths of the building material produced with this additive. The essential constituent of the agents used according to this U.S. patent specification consists of sulfonic acid groups which are bonded to a formaldehyde resin, these resins being obtained by the condensation of aromatic sulfonic acids, in particular of naphthalenesulfonic acids, with formaldehyde.

Following on from the principle according to U.S. Pat. No. 2,141,569, a number of other sulfonic acids, such as, for example, lignosulfonic acids (U.S. Pat. No. 2,169,980), polybenzylsulfonic acids (U.S. Pat. No. 2,445,569) and also resins which are based on an amino-s-triazine having at least two $NH_2$ groups and are modified by sulfite or sulfonic acid, were also proposed as dispersing agents for cements; these dispersing agents possess, in particular, a plasticizing action resulting from the possibility, associated with this plasticizing action, of using less water, but also possess a strengthening action.

On the other hand, if the use of less mixing water is dispensed with, the building material becomes easier to pour or pump; however, a lower early strength is exhibited, in particular in the first hours of the hardening stage, and this is a result of a delay in the hardening process.

The modified triazine resins used according to British Pat. No. 1,169,582 are primarily products resulting from the reaction of melamine/formaldehyde resins with alkali metal sulfites or alkali metal salts of disulfurous acid, in which the sulfite radical reacts with the methylol groups of the resin. The $SO_3H$ group of these modified resins is therefore primarily bonded to the triazine via $—O—CH_2—$ bridges.

In addition to these resins, resins modified by sulfonic acid are also mentioned which are derived from diaminotriazines, such as acetoguanamine or benzoguanamine, in which the sulfonic acid group is bonded to the methyl or phenyl group, that is to say directly to the triazine employed for forming the resin. Such sulfonic acids are very difficult to obtain and resins derived therefrom have found no use in practice.

Alternatively, according to Austrian Pat. No. 342,867, it is possible, in the production of aminotriazine/formaldehyde resins which are modified by sulfonic acid groups by being reacted with alkali metal sulfites during the formation of the resin, to replace up to 40 mole % of the melamine by urea, without affecting the action as an additive for building materials.

Surprisingly, it was possible to find that additives based on specially modified aminoplast resins, for building materials based on inorganic binders, can be produced which have a very good plasticizing action without exerting a negative influence on the development of early strength, provided that the aminoplast resins employed are melamine/urea/formaldehyde mixed resins which have been modified with fixed amounts of aromatic aminosulfonic acids, in particular sulfanilic acid. These new additives are distinguished in that they bring about an increase in the early strength, even when the use of less mixing water is dispensed with for the benefit of the flowability of the building material. It is surprising, in this case, that the urea constituent in the resin is essential for achieving the good early strength, whereas, hitherto, urea has acted in the best case, in this respect, as an inactive substitute for the aminotriazine.

Accordingly, the subject of the present invention is an additive for organic binders, such as, preferably, cement, magnesia cement and calcium sulfate, which comprises a water-soluble salt of a mixed condensate of urea, melamine, an aromatic aminosulfonic acid and formaldehyde, in which the molar ratio of the aromatic aminosulfonic acid to the total amount of melamine and urea is (0.2 to 1.0):1.0 and the molar ratio of melamine to urea is from 0.75:0.25 to 0.30:0.70.

As a rule, the molar ratio of the total amount of melamine and urea to formaldehyde is 1:(1.5 to 3.0).

Particularly favorable strength properties are achieved when the proportion of urea in the resin is predominant relative to the melamine, that is to say the ratio of urea to melamine is greater than 1, and it is simultaneously favorable to keep the proportion of formaldehyde as low as possible.

Sulfanilic acid may be mentioned in particular as the aromatic aminosulfonic acid. Other aromatic aminosulfonic acids, which can be derived, for example, from either benzene or naphthalene, are, for example, metanilic acid, naphthionic acid, 1-naphthylamine-6-sulfonic acid (Cleve's acid), 1-naphthylamine-5-sulfonic acid (Laurent's acid), 1-naphthylamine-3,6-disulfonic acid and 1-naphthylamine-3,6,8-trisulfonic acid.

Water-soluble salts of the modified aminoplast resins which may be mentioned are primarily the alkali metal or alkaline earth metal salts such as, in particular, the Na, K or Ca salt or the ammonium salt.

Suitable building materials to which the additive according to the invention can be added in order to improve the properties are primarily cement mortar and concrete, the additives being suitable both for pourable concrete (keeping the amount of mixing water constant) and for high-strength concrete, less mixing water being used in the latter case as a result of the additive according to the invention. However, the additive according to the invention can also be successfully added to other inorganic building materials which are based on gypsum, anhydrite, lime, magnesia cement or alumina cement as the binder.

The additive, which as a rule is present as an approximately 20% strength aqueous solution, is added in an amount of 0.01 to 20% by weight of solid resin in this solution, relative to the content of inorganic binder in the building material. The amount is preferably 0.1 to 10% by weight of solid resin. However, the aminoplast resin produced in aqueous solution can also be dried in accordance with one of the customary drying processes, for example the spray-drying process, its plasticizing properties being kept constant, and can be added to the building materials as a pulverulent resin.

The additives is usually admixed, immediately before processing, directly with the mixture of the binder with water and the customary additives. However, it is also possible, for example, to mix the salt of the modified aminoplast resin initially with the mixing water and then to incorporate the binder and the additives, such as sand, gravel and the like.

The modified aminoplast resins according to the invention can be produced in accordance with customary methods. Thus, for example, the melamine can be precondensed in the alkaline region with part of the formaldehyde and a salt, preferably an alkali metal salt of the aminosulfonic acid, and the urea, which has previously already been methylolated, can then be added. The pH value is then lowered to values of about 4 to 6.5 by adding acids and the condensation is carried out until the desired viscosity, which as a rule is in the range from 5 to 50 mPas/20° C. in 20% strength solution, is obtained. The condensation reaction is ended by increasing the pH value to values of between 7.5 and 9. However, it is also possible to precondense the melamine and urea simultaneously, to add the sulfonic acid and, after the reaction has been carried out, to initiate the actual condensation by lowering the pH value.

The condensation is preferably carried out at elevated temperature in order to shorten the reaction times. However, it is also possible to carry out the condensation at room temperature, in particular when the reaction is carried out at low pH values.

The purpose of the following examples is to illustrate the present invention in greater detail, without intending to restrict it thereto.

EXAMPLE 1 TO 12

A g of melamine (M) are mixed with b g of a 36.9% strength formaldehyde solution (F/M) in a reaction vessel and the mixture is adjusted to pH 9.0 with 3 N sodium hydroxide solution and heated; after the melamine has dissolved, c g of the salt of the aminosulfonic acid S in d g of water ($H_2O/S$) are added. This mixture is kept at a temperature of 75° C. for 45 minutes in the alkaline pH range (pH=10.5) and then diluted with e g of water ($H_2O/V$). A solution of f g of urea in g g of 36.9% strength formaldehyde solution (F/U) is then added thereto. The whole mixture is now acidified to pH 5.5 to 6.0 with sulfuric acid or formic acid and condensed at 75° C. until a viscosity of 9 mPas at 20° C. is obtained in a Haake rotating cylinder viscometer, velocity gradient D=976 seconds$^{-1}$, is obtained. The pH value of the whole mixture is then adjusted to pH 8.5 with 30% strength sodium hydroxide solution. After cooling to 20° C., a resin solution which can be diluted with water and has an effective solids concentration of 20 to 22% is obtained.

The resins thus obtained are summarized in the following table and the aromatic aminosulfonic acid employed was as follows: sulfanilic acid in Examples 1 to 7, metanilic acid in Example 8, 1-naphthylamine-6-sulfonic acid in Example 9, 1-naphthylamine-4-sulfonic acid in Example 10, 1-naphthylamine-5-sulfonic acid in Example 11 and 1-naphthylamine-3,6-disulfonic acid in Example 12.

| Example N | U:M:S:F Molar ratio | a M | b F/M | c S | d $H_2O/S$ | e $H_2O/V$ | f U | g F/U |
|---|---|---|---|---|---|---|---|---|
| 1 | 0.5:0.5:0.4:2.25 | 63 | 121.95 | 99.6 | 293.2 | 399.5 | 30 | 60.97 |
| 2 | 0.25:0.75:0.4:2.25 | 94.5 | 156.8 | 99.6 | 359.5 | 388.5 | 15 | 26.13 |
| 3 | 0.4:0.6:0.4:2.4 | 75.6 | 146.34 | 99.6 | 320.8 | 401.4 | 24 | 48.78 |
| 4 | 0.6:0.4:0.4:2.1 | 50.4 | 97.56 | 99.6 | 265.6 | 397.47 | 36 | 73.17 |
| 5 | 0.7:0.3:0.4:2.25 | 37.8 84.55 | 99.6 | 239.2 | 409.35 | 42 | 98.37 | |
| 6 | 0.5:0.5:0.4:1.5 | 63 | 81.3 | 99.6 | 289 | 366.9 | 30 | 40.65 |
| 7 | 0.5:0.5:0.55:3.0 | 63 | 162.6 | 136.95 | 355.6 | 475.5 | 30 | 81.3 |
| 8 | 0.5:0.5:0.33:2.25 | 126 | 243.9 | 170.4 | 558.3 | 813.8 | 60 | 122.0 |
| 9 | 0.5:0.5:0.4:2.25 | 126 | 243.9 | 210.6 | 693.1 | 104.9 | 60 | 122.0 |
| 10 | 0.5:0.5:0.4:2.25 | 126 | 243.9 | 210.6 | 693.1 | 104.9 | 60 | 122.0 |
| 11 | 0.5:0.5:0.4:2.25 | 63 | 121.9 | 105.3 | 346.8 | 522.2 | 30 | 61.0 |
| 12 | 0.5:0.5:0.2:2.25 | 63 | 121.9 | 91.8 | 275.0 | — | 30 | 61.0 |

EXAMPLE 13

Parallel samples of a cement mortar were produced from PZ 275 Portland cement and, with the exception of a control sample, the additive according to the invention, produced in accordance with Example 1, was added in an amount of 1% by weight of solid resin, relative to the cement. The samples were adjusted to a constant spread of 15.5 to 16.0 cm and the water-saving effect of the additive was thus utilized. Test pieces having dimensions of 4×4×16 cm were produced from these samples in accordance with DIN 1164, hardened and tested. The results are summarized in the table, in which B is the bending tension strength and D is the compressive strength in N/cm$^2$.

|  | Control | Additive according to Example 1 |
|---|---|---|
| W/C | 0.53 | 0.46 |
| 24 hours | | |
| B | 220 | 350 |
| D | 1,010 | 1,320 |
| 2 days | | |
| B | 370 | 450 |
| D | 1,980 | 2,510 |
| 4 days | | |
| B | 550 | 560 |
| D | 3,210 | 3,540 |
| 7 days | | |
| B | 618 | 670 |
| D | 3,690 | 4,430 |

EXAMPLE 14

Samples having a constant water/cement ratio of 0.5 were also produced with PZ 275 Portland cement and, with the exception of the control experiment, the additives according to Examples 1 to 12 were used as in Example 13. The test was carried out in accordance with DIN 1164, test pieces having overall dimensions of 4×4×16 cm being produced. The results are recorded in the table, B and D again being the bending tension strength and compressive strength in N/cm$^2$.

| Example | Spread cm, DIN 1164 | 18 hours B | 18 hours D | 24 hours B | 24 hours D |
|---|---|---|---|---|---|
| Control | 12.3 | 278 | 1,190 | 360 | 1,640 |
| 1 | 22.8 | 314 | 1,350 | 420 | 1,810 |
| 2 | 25.2 | 353 | 1,350 | 467 | 1,850 |
| 3 | 25.6 | 329 | 1,240 | 407 | 1,810 |
| 4 | 24.0 | 335 | 1,330 | 456 | 1,770 |
| 5 | 23.0 | 310 | 1,210 | 424 | 1,700 |
| 6 | 25.2 | 320 | 1,170 | 425 | 1,590 |
| 7 | 23.8 | 316 | 1,337 | 350 | 1,660 |
| 8 | 23.0 | 310 | 1,200 | 400 | 1,820 |
| 9 | 22.4 | 350 | 1,320 | 365 | 1,620 |
| 10 | 22.2 | 354 | 1,290 | 476 | 1,824 |
| 11 | 20.6 | 375 | 1,200 | 350 | 1,580 |
| 12 | 18.0 | 369 | 1,150 | 335 | 1,470 |

EXAMPLE 15

A concrete mix was produced in a compulsory type mixer from 8.3 kg of PZ 275 Portland cement, 4.98 kg of water, 10.88 kg of gravel of 0-1 mm round grain, 10.88 kg of gravel of 1-4 mm round grain, 8.16 kg of gravel of 4-8 mm round grain, 13.6 kg of gravel of 8-16 mm round grain and 10.88 kg of gravel of 16-32 mm round grain. The spread of the reference concrete, determined in accordance with AUSTRIAN STANDARD SPECIFICATION No. 3,303, was 40 cm.

If the aqueous resin solution produced in accordance with Example 1 is added to the concrete, at the same W/C ratio, in an amount corresponding to 0.4% of solid resin, relative to the cement, the spread increases to 53 cm.

The development of compressive strength of the pourable concrete produced according to the invention has the following values, in $N/cm^2$, which are given in comparison with the control.

| | Resin according to Example 1 | Control |
|---|---|---|
| 12 hours | 203 | 77 |
| 18 hours | 550 | 360 |
| 48 hours | 1,820 | 1,540 |
| 7 days | 2,770 | 2,470 |
| 28 days | 3,720 | 3,330 |

EXAMPLE 16

Using the same additives as described in Example 15, 8.3 kg of PZ 275 Portland cement were processed to give a concrete (W/C=0.58) which possessed a slump of 40 cm according to AUSTRIAN STANDARD SPECIFICATION No. 3,303. If the resin solution according to Example 1 is added, when preparing the same concrete mix, in an amount corresponding to 0.6% of solid resin, relative to the cement, a W/C ratio of only 0.54 is required in order to achieve approximately the same slump of 40.5 cm.

The concrete thus obtained possessed a compressive strength of 2,700 $N/cm^2$ after 2 days, 3,090 $N/cm^2$ after 4 days, 3,410 $N/cm^2$ after 7 days and 4,330 $N/cm^2$ after 28 days, in contrast to the control experiment which gave a compressive strength of 1,900 $N/cm^2$ after 2 days, 2,250 $N/cm^2$ after 4 days, 2,750 $N/cm^2$ after 7 days and 3,930 $N/cm^2$ after 28 days.

EXAMPLE 17

1,200 g of stucco plaster and 504 g of water were intimately mixed in a compulsory type mixer in accordance with DIN 1164, sheet 7, and the slump was determined as 19 cm.

Mixtures containing the same amount of plaster were now prepared, with the addition of the aqueous resin solution according to Example 1 in an amount corresponding to an addition of 0.5% of solid resin, relative to the plaster, and the amount of water was reduced, compared with the control, until the slump was adjusted to 19 cm.

Test pieces having overall dimensions of 4×4×16 cm were produced from all 3 samples. After stripping, the plaster prisms thus obtained were stored for 7 days under standard climatic conditions (65% atmospheric humidity, 22° C.) and then dried to constant weight at 40° C.

The values for the bending tension strength and compressive strength, in $N/cm^2$, determined in accordance with DIN 1164, are given in the following table.

| | Bending tension strength | Compressive strength |
|---|---|---|
| Control | 540 | 2,610 |
| Resin according to Example 1 | 781 | 3,260 |

EXAMPLE 18

A magnesia cement was produced from 226.8 g of $MgCl_2.6H_2O$, 600 g of calcined magnesite, 212.3 g of water, 200 g of matchwood and 60.6 g of the resin solution according to Example 1, corresponding to 2% of solid resin. As a control, the same amounts of $MgCl_2.6H_2O$, magnesite and matchwood were only mixed with an amount of water of 272.8 g, with no resin content. Both mixtures were filled into 4×4×16 cm molds, dried for 1 hour at 120° C. and stored for 10 days at 23° C. The tests of the bending tension strength and the compressive strength gave 815 $N/cm^2$ and 1,630 $N/cm^2$, respectively, in the case of the magnesia cement according to the invention, compared with 565 $N/cm^2$ and 1,150 $N/cm^2$ in the case of the control.

EXAMPLE 19

192.8 g of 35% strength formaldehyde solution are placed in a reaction flask and 50.4 g of melamine and 36 g of urea are introduced, whilst stirring. The heating is now switched on and, at 25° C., the pH value of the mixture is adjusted to pH 9.0 with sodium hydroxide solution. The temperature is raised to 80° C. in the course of 15 minutes. At this temperature, a clear solution is formed. The Na sulfanilate solution prepared as follows is then added:

271.2 g of distilled $H_2O$ and 16 g of caustic soda are treated, after dissolution of the caustic soda, with 69.2 g of sulfanilic acid and, if necessary, the pH is adjusted to 10.5 with 50% strength NaOH solution.

The pH value of the whole mixture is adjusted to 10.5 by means of sodium hydroxide solution and the mixture is allowed to react for 45 minutes at 75° C. It is then diluted with 401.7 g of distilled $H_2O$ and the reaction mixture is cooled to 55° C. The pH value is adjusted to 5.0 with 20% strength formic acid. At 55° C., the mixture is condensed until a viscosity of 63 to 67 seconds, at 20° C. in a 2 mm DIN flow cup, is obtained. After the desired viscosity has been reached, the pH value of the whole mixture is adjusted to 8.5 with 50% strength NaOH solution and cooled to room temperature in the course of 30 minutes.

Properties of the resin:

Viscosity 8–10 mPas

Solids content about 20%

Properties of a cement mortar according to DIN 1164, containing PZ 275 cement, after 18 hours Water/cement ratio 0.5

1% of solid resin/cement

Resin composition

U / M / S / F = 0.6 / 0.4 / 0.4 / 2.25

|  | Spread in cm | B | $B/B_o$ | N/mm² D | $D/D_o$ |
|---|---|---|---|---|---|
| Reference sample | 13.8 | 3.15 |  | 13.5 |  |
| Resin | 20–21 | 3.52 | 1.12 | 14.0 | 1.04 |

EXAMPLE 20

Resins having the composition given below, which were produced analogously to Examples 1–12 and 19, were processed with 2 samples of PZ 275 cement of different origin to give a cement mortar according to DIN 1164 and were tested. The water/cement ratio was 0.5 and the addition of resin amounted to 1% of solid resin, relative to the cement. The test was carried out 18 hours after the preparation of the mortar. The composition of the resins was chosen so that a constant ratio of formaldehyde to urea of 1.0 and a constant ratio of formaldehyde to melamine of 2.5 was maintained. The resins were employed as an approximately 20% strength aqueous solution. The results are summarized in the table in which A is the spread. In order to illustrate the effect more clearly, the ratio of the compressive strength or bending tension strength achieved to the values for the cement mortar sample without added resin is also given in the table.

| Resin U:M:F:S | Cement 1 | | | | |
|---|---|---|---|---|---|
|  | A cm | B N/mm² | $B/B_2$ | D N/mm² | $D/D_o$ |
| without resin | 13.65 | 3.04 |  | 14.12 |  |
| 0.2:0.8:0.4:2.20 | 26.8 | 2.65 | 0.87 | 11.48 | 0.81 |
| 0.3:0.7:0.4:2.05 | 27.0 | 2.62 | 0.86 | 12.46 | 0.88 |
| 0.4:0.6:0.4:1.9 | not determined | | | | |
| 0.5:0.5:0.4:1.75 | 25.1 | 3.11 | 1.02 | 12.46 | 0.88 |
| 0.6:0.4:0.4:1.6 | 25.2 | 3.27 | 1.08 | 13.14 | 0.93 |

| Resin U:M:F:S | Cement 2 | | | | |
|---|---|---|---|---|---|
|  | A cm | B N/mm² | $B/B_o$ | D N/mm² | $D/D_o$ |
| without resin | 13.4 | 2.03 |  | 7.79 |  |
| 0.2:0.8:0.4:2.20 | 24.0 | 1.74 | 0.86 | 7.27 | 0.93 |
| 0.3:0.7:0.4:2.05 | 23.7 | 2.17 | 1.07 | 8.61 | 1.11 |
| 0.4:0.6:0.4:1.9 | 23.9 | 2.25 | 1.11 | 8.86 | 1.14 |
| 0.5:0.5:0.4:1.75 | 23.2 | 2.21 | 1.07 | 8.66 | 1.11 |
| 0.6:0.4:0.4:1.6 | 23.0 | 3.12 | 1.54 | 10.2 | 1.31 |

What is claimed is:

1. A mixture containing an inorganic binder from the group consisting of cement, magnesia cement and calcium sulfate, and having improved flowability and increased early strength, which comprises water, the inorganic binder and 0.01 to 20%, relative to the inorganic binder, of a water-soluble salt of a mixed condensate of urea, melamine, an aromatic aminosulfonic acid and formaldehyde, in which the molar ratio of the aromatic aminosulfonic acid to the total amount of urea and melamine is from 0.2 to 1.0:1 and the molar ratio of melamine to urea is from 0.75:0.25 to 0.30:0.70.

2. A mixture containing an inorganic binder, according to claim 1, in which the molar ratio of urea and melamine, together, to formaldehyde, in the water-soluble salt of the mixed condensate, is 1:(1.5 to 3.0).

3. Mixture containing an inorganic binder, according to claim 1, in which the aromatic aminosulfonic acid is selected from the group consisting of sulfanilic acid, metanilic acid, naphthyl-1-amine-6-sulfonic acid and naphthyl-1-amine-4-sulfonic acid.

4. Mixture containing an inorganic binder, according to claim 1, in which the water-soluble salt of the mixed condensate is an alkali metal salt, alkaline earth metal salt or ammonium salt.

5. Mixture containing an inorganic binder, according to claim 1, in which the molar ratio of urea to melamine in the water-soluble salt of the mixed condensate is greater than 1.

* * * * *

UNITED STATES PATENT AND TRADEMARK OFFICE
CERTIFICATE OF CORRECTION

PATENT NO. : 4,272,430
DATED : June 9, 1981
INVENTOR(S) : Stefan Pieh & Hubert Czepel It is certified that error appears in the above-identified patent and that said Letters Patent are hereby corrected as shown below:

In Column 4, please correct the Table so that the entire line designated Example "5" reads as follows:

--
5  0.7:0.3:0.4:2.25   37.8   84.55   99.6   239.2   409.35   42   98.37
--

In Column 4, between Examples 5 and 6, delete "84.55".

Signed and Sealed this

Ninth Day of March 1982

|SEAL|

Attest:

Attesting Officer

GERALD J. MOSSINGHOFF

Commissioner of Patents and Trademarks